United States Patent [19]

Bray et al.

[11] Patent Number: 4,924,522
[45] Date of Patent: May 8, 1990

[54] METHOD AND APPARATUS FOR DISPLAYING A HIGH RESOLUTION IMAGE ON A LOW RESOLUTION CRT

[75] Inventors: John E. Bray, Guelph; David Poos, Grimsby, both of Canada

[73] Assignee: NCR Corporation, Dayton, Ohio

[21] Appl. No.: 351,264

[22] Filed: May 11, 1989

Related U.S. Application Data

[63] Continuation of Ser. No. 89,715, Aug. 26, 1987, abandoned.

[51] Int. Cl.⁵ .............................................. G06K 9/46
[52] U.S. Cl. ...................................... 382/56; 340/793
[58] Field of Search ............. 340/703, 723, 729, 730, 340/731, 750, 793, 814; 358/263, 287, 21 R, 433, 451; 364/521; 382/47, 50-53, 56

[56] References Cited

U.S. PATENT DOCUMENTS

| | | | |
|---|---|---|---|
| 4,134,133 | 1/1979 | Teramura et al. | 358/260 |
| 4,150,400 | 4/1979 | Wong | 358/261 |
| 4,399,435 | 8/1983 | Urabe | 340/750 |
| 4,468,809 | 8/1984 | Grabowski et al. | 382/50 |
| 4,486,785 | 12/1984 | Lasher et al. | 340/739 |
| 4,628,534 | 12/1986 | Marshall | 382/47 |
| 4,736,239 | 4/1988 | Sprague et al. | 358/21 R |

Primary Examiner—Leo H. Boudreau
Assistant Examiner—Jose L. Couso
Attorney, Agent, or Firm—Wilbert Hawk, Jr.; Albert L. Sessler, Jr.; Elmer Wargo

[57] ABSTRACT

A method and apparatus for displaying a high resolution image on a low resolution CRT with a minimal loss of information. Even rows of a source or matrix of binary pixels are stored in an "even" video RAM and odd rows are stored in an "odd" video RAM at addresses corresponding to the locations of the binary pixels within the matrix. In a preferred embodiment, a group of four pixels corresponding to a portion of the image is converted to a single gray value which is used to control the intensity of the beam control within the CRT.

6 Claims, 4 Drawing Sheets

FIG. 4A
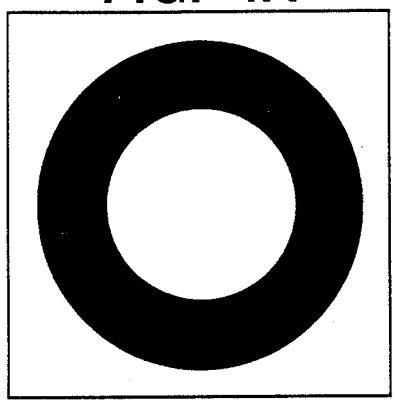
ACTUAL DOCUMENT
FIG. 4B
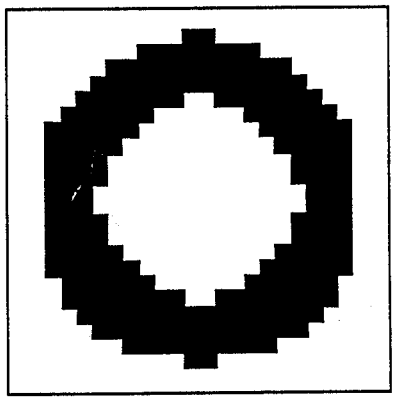
ORIGIONAL IMAGE
10 PIXELS/INCH
FIG. 4C
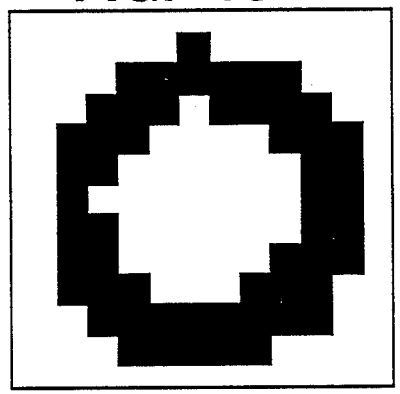
PIXEL DROPPING TO
5 PIXELS/INCH
FIG. 4D
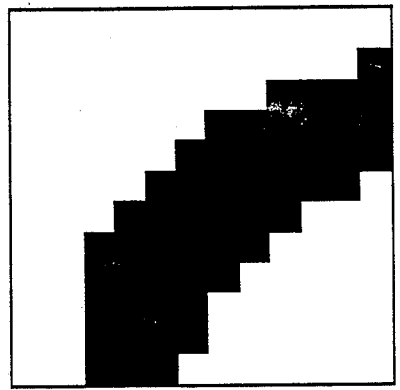
PARTIAL DISPLAY AT
5 PIXELS/INCH
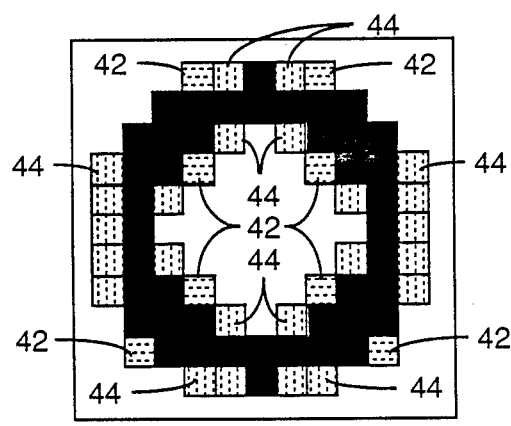
FIG. 4E
SUGGESTED SOLUTION:
GRAY LEVEL
MAPPED IMAGE AT
5 PIXELS/INCH

| ADDRESS LOOK-UP TABLE 58 | | | | |
|---|---|---|---|---|
| BIT POSITION | | | | GRAY LEVEL |
| 3 | 2 | 1 | 0 | |
| 0 | 0 | 0 | 1 | 0 |
| 0 | 0 | 0 | 1 | 1 |
| 0 | 0 | 1 | 0 | 1 |
| 0 | 0 | 1 | 1 | 1 |
| 0 | 1 | 0 | 0 | 1 |
| 0 | 1 | 0 | 1 | 1 |
| 0 | 1 | 1 | 0 | 1 |
| 0 | 1 | 1 | 1 | 2 |
| 1 | 0 | 0 | 0 | 1 |
| 1 | 0 | 0 | 1 | 1 |
| 1 | 0 | 1 | 0 | 1 |
| 1 | 0 | 1 | 1 | 2 |
| 1 | 1 | 0 | 0 | 1 |
| 1 | 1 | 0 | 1 | 2 |
| 1 | 1 | 1 | 0 | 2 |
| 1 | 1 | 1 | 1 | 3 |

METHOD AND APPARATUS FOR DISPLAYING A HIGH RESOLUTION IMAGE ON A LOW RESOLUTION CRT

This is a continuation of copending application Ser. No. 089,715 filed on Aug. 26, 1987 now abandoned.

BACKGROUND OF THE INVENTION

This invention relates to a method and apparatus for displaying high resolution binary image data on a CRT having a resolution which is lower than the resolution of the binary image data with a minimal loss of visual information.

At the present time, documents are scanned along a scanning line to produce a predetermined resolution or number of pixels (picture elements) per inch. For example, the resolution may range from about 100 to about 300 pixels per inch, with about 200 pixels per inch being used by certain industry groups, like facsimile equipment manufacturers, for example. Display screens to display a pixel density of 300 per inch are extremely expensive if they are available at all.

While the image data for documents is produced in the densities mentioned in the previous paragraph, it is difficult to obtain low-cost, high density viewing screens. For example, high resolution viewing screens for CRTs have densities of 75, 100, or as high as 150 pixels per inch. In order to display (at normal size) an image developed at 200 pixels per inch on a screen having a resolution of 100 pixels per inch, it is necessary to perform some compaction of the image. For example, a 100 pixel per inch screen requires a 2-to-1 compaction for image data which was developed at 200 pixels per inch.

One simple option for compaction is referred to as pixel dropping. This technique entails removing rows and columns of pixels from the image data to fit the appropriate size for the display screen; however, a problem with this technique is that narrow horizontal or vertical lines can be lost in the process, and edge aliasing (raggedness) is produced. Other elaborate schemes of this type which can preserve horizontal and vertical lines are available; however, these schemes tend to create unwanted "artifacts" on the displayed image.

Another way of handling the mismatch between the density of the image data and the resolution of the associated display screen is to display as much of the image as possible without dropping any pixels. In this situation, the image displayed is larger than the original, and a correspondingly smaller fraction of the original image area is visible on the display. In this case, the edges of the image will appear more ragged due to the magnification of the image.

In certain applications, having less than the entire image on a display screen presents an unsatisfactory solution. For example, in the processing of financial documents, like checks, it is necessary to look at the entire image of a check on a display screen in order to verify the monetary amount and other data on the check as part of normal processing.

SUMMARY OF THE INVENTION

An object of this invention is to display high resolution data on a lower resolution display screen with a minimal loss of information.

In a system in which image data for an image is provided in the form of a matrix of binary pixels of a first predetermined resolution, the preferred method of displaying said image data onto a CRT having a resolution lower than said first predetermined resolution, comprises the steps: (a) selecting a predetermined number of said pixels which represents a predetermined area of said image data; (b) examining the status of each pixel in said predetermined area to determine whether it is a binary one or a binary zero; (c) assigning a predetermined value ranging from zero through n for the various combinations of binary ones and binary zeros which exist in said predetermined area wherein n is greater than one; (d) using a said predetermined value to control a gray scale value ranging from completely white to completely black to display on said CRT said gray scale value as representing said predetermined area of said image; (e) selecting in a predetermined pattern an adjacent said predetermined area for said image; and (f) repeating steps b, c, and d for said adjacent predetermined area and the remaining predetermined areas for said image.

In another aspect, this invention includes a system having: a source of image data of a first predetermined resolution stored in the form of a matrix of rows and columns of binary pixels; first means for storing even rows of said binary pixels in a first memory at addresses corresponding to their locations in said matrix; second means for storing odd rows of said binary pixels in a second memory at addresses corresponding to their locations in said matrix; means for selecting from said first and second means a group of those of said pixels corresponding to a predetermined area of said matrix of pixels; representing means for representing said group of pixels as a gray scale value which is a function of the number of binary pixels of a first type within said group, said gray scale value ranging from zero through n wherein n is greater than one; and display means for displaying said gray scale value at a location corresponding to said predetermined area of said matrix of binary pixels; said display means including a beam control and a CRT having a resolution which is less than said first predetermined resolution, with said gray scale value being used to control the intensity of said beam control.

The advantages and features of this invention will be more readily understood in connection with the following specification, claims, and drawing.

BRIEF DESCRIPTION OF THE DRAWING

FIG. 4A represents an actual image on a document;

FIGS. 4B, 4C, 4D, and 4E represent various simulated CRT images corresponding to the actual image shown in FIG. 4A;

DETAILED DESCRIPTION OF THE INVENTION

Before proceeding with a detailed description of this invention, it appears useful to discuss some of the characteristics of display tubes, like cathode ray tubes (CRTs) as they relate to displaying binary data. When displaying black and white binary pixel data, for example, on a cathode ray tube (CRT), it would be ideal if the transitions from white to black and vice versa were to take place instantly; however, in reality, this does not occur. Due to the inherent impedance in the analog circuits which drive the CRT, there is a limited rise time or fall time when encountering a transition in the pixel data. In other words, each CRT has a limited bandwith. If one wanted to double the pixel density to be displayed on a CRT relative to its usual bandwith, it would not be possible because the rise and fall times mentioned would take longer, most likely, than the time to display one of the "smaller" pixels having a resolution higher than the resolution normally displayed on the CRT. The present invention provides a method and apparatus for displaying high resolution binary image data on a CRT having a resolution or density which is lower than the resolution of the binary image data with a minimal loss of visual information.

Figure 1:
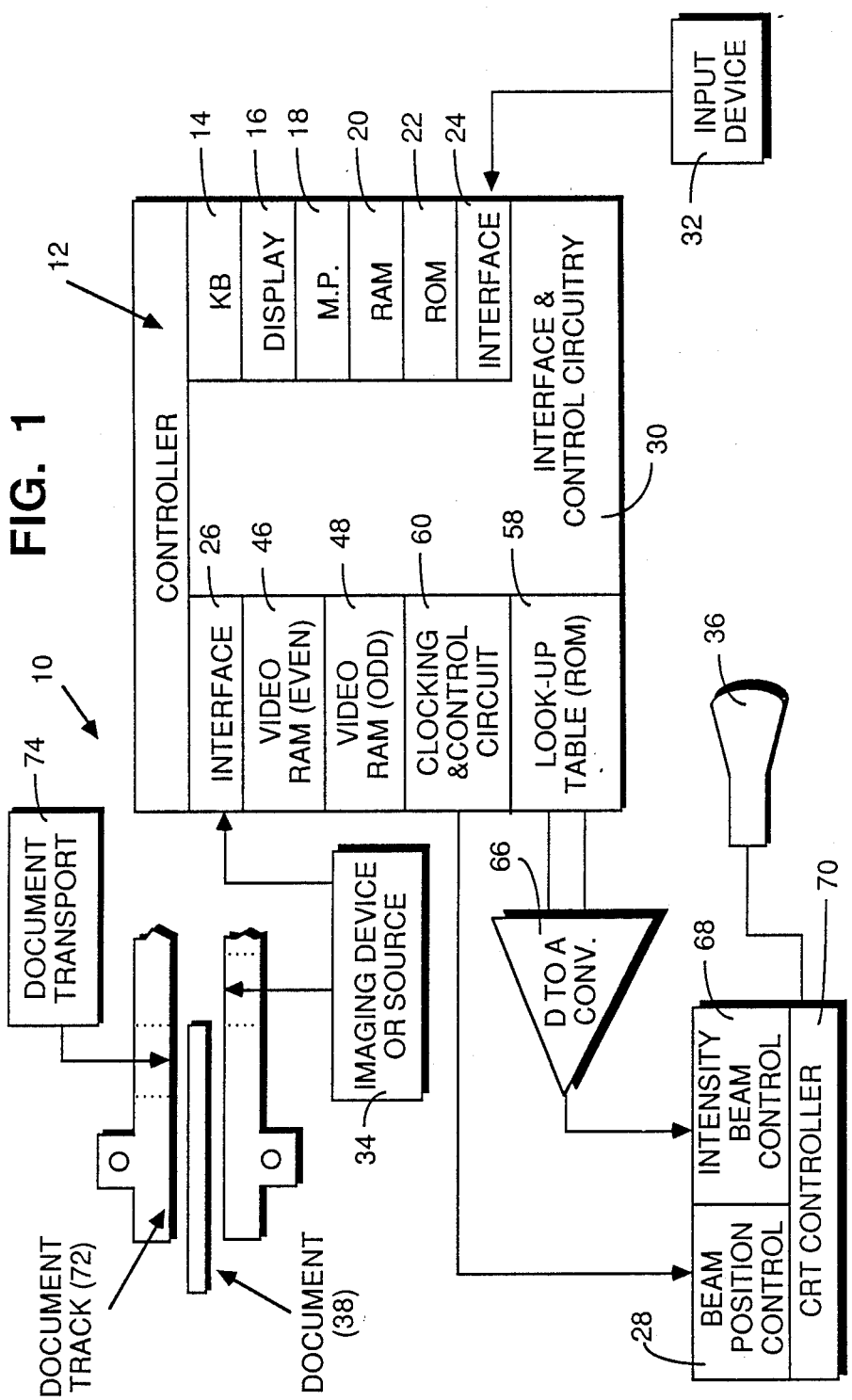
FIG. 1 is a general schematic view of a system in which the apparatus of this invention may be used.

In this regard, FIG. 1 is a general, schematic view of the system or apparatus 10 of this invention. The apparatus 10 includes a controller which is designated generally as 12 and shown in a functional form to facilitate a description of its operation and relationship to other elements in the apparatus 10. The actual form of the controller 12 is different from that shown in FIG. 1.

The controller 12 includes certain conventional elements such as a keyboard (KB) 14; a display 16; a microprocessor (MP) 18; a RAM 20; a ROM 22; several interfaces 24 and 26; and interface and control circuitry 32 which are all coupled together to enable the controller 12 to function as an intelligent device. An input device 32 may be used to load the RAM 22 with operating software, for example, or the interface 24 may be used to couple the controller 12 to a host computer where necessary or desirable. The apparatus 10 also includes a source 34 of image data which is to be displayed on the CRT 36.

The source 34 of image data may also originate with a means for imaging data or information on a document 38; this aspect will be discussed in more detail hereinafter. For the moment, it is sufficient to state that the source 34 of image data includes a matrix of binary data which is to be displayed on the CRT 36.

Figure 2:
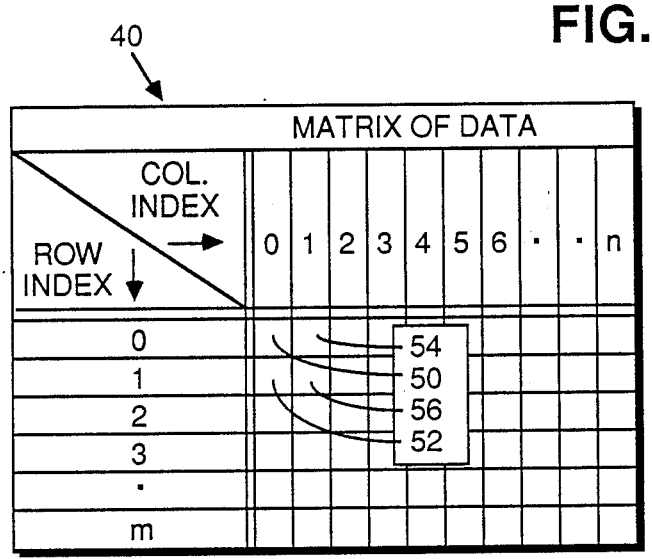
FIG. 2 shows how the source of the matrix data is arranged as received by the apparatus of this invention.

The matrix of data included in the source 34 is shown in FIG. 2 and is given the general designation 40. Each cell within the matrix 40 contains a single binary bit which is either a binary one or "black", or a binary zero or "white". Each cell within the matrix is identified by a column index beginning with "zero" and ending with "n". Correspondingly, each cell is identified by a row index beginning with "zero" and ending with "m". Each cell of data within the matrix 40 corresponds to a pixel which was derived from a corresponding part of the associated document, like document 38 in FIG. 1.

To illustrate some image reduction techniques alluded to earlier herein, assume that FIG. 4A represents the actual image on a document, like document 38 in FIG. 1. Assume, also, that the image resolution for the image in FIG. 4A was obtained at ten pixels per inch. In FIG. 4B, the image is displayed on a CRT at an image resolution of ten pixels per inch. With the previously-mentioned pixel dropping technique of dropping every other row and column, the resulting image, when displayed at an image resolution of five pixels per inch would look like the image shown in FIG. 4C. FIG. 4D shows a simulated image display at a resolution of five pixels per inch of only a portion of the image, with only the upper left hand portion of the image of FIG. 4A being shown in FIG. 4D.

FIG. 4E shows a simulated image as it would be presented on a CRT according to the apparatus and method of this invention. Instead of having only black and white pixels, the image in FIG. 4E includes gray pixels, like 42 and 44. Gray pixels 44 are darker than gray pixels 42. The gray pixels 42 are shown with horizontal lines, and the darker gray pixels 44 are shown with vertical lines in FIG. 4E. When FIG. 4E is viewed from a distance, the viewer's eyes tend to "blend" the black and gray pixels so that the image seen by the viewer tends to be a more faithful reproduction of the actual image shown in FIG. 4A than the image shown in FIG. 4C which is the result of the "pixel dropping" technique. The apparatus 10 maps the high resolution images on to lower resolution screens so as to take advantage of the "blending" effect mentioned. In one embodiment, a predetermined area of four pixels (a 2×2 area) is represented as one pixel or dot on a display screen with an intensity or gray scale value that is a function of the number of black pixels within the predetermined area or block. If the original image has a resolution of ten pixels per inch as shown in FIG. 4B, the corresponding image will look like that shown in FIG. 4C when compressed by the conventional pixel dropping technique mentioned and thereafter displayed on a CRT having a resolution of five pixels per inch. Notice that the image in FIG. 4E provides a more faithful reproduction of the image of FIG. 4B than does the image of FIG. 4C even though the image of FIG. 4E is also displayed at five pixels per inch. A point to be made here, also, is that if a CRT can display a black pixel (full intensity) in a certain time period, it can also display a gray pixel (less than full intensity) within that same period.

Continuing with the apparatus 10 shown in FIG. 1, it should be recalled that the source 34 of data is a matrix 40 of binary pixels as shown in Fig. 2. A conventional software routine included in the ROM 22 or RAM 20 is used to transfer the data from the source 34 into two video RAMs 46 and 48. Each of the RAMs 46 and 48 can be thought of as a circulating memory whereby, at any time, one can extract an eight bit byte of data through a port associated with the RAM. The RAMs 46 and 48 are essentially arrays of chips, like part No. TMS4161, for example, which are manufactured by Texas Instruments, for example, and these chips are mounted on the "board" on which the controller 12 is mounted.

The matrix 40 of pixel data (FIG. 2) is transferred to the video RAMs 46 and 48 in the following manner. The pixel data which is located within the even rows of data (0, 2, 4, . . . m) is transferred to the even video RAM 46, and correspondingly, the odd rows of pixel data (1, 3, 5, . . . m) is transferred to the odd video RAM 48. Each pixel (a binary 1 or 0) coming from the matrix 40 of data has a row and column address when transferred to the RAMs 46 and 48. For example, the pixel 50 located at row "0" and column "0" in the matrix 40 of data has an address designation of (0, 0) in the even RAM 46; the "row" designation is given first, followed by the "column" designation. Correspondingly, a pixel 52 located at the odd row "1" and column "0" in the matrix 40 of data has an address designation of (1, 0) in the odd RAM 48.

Figure 3:
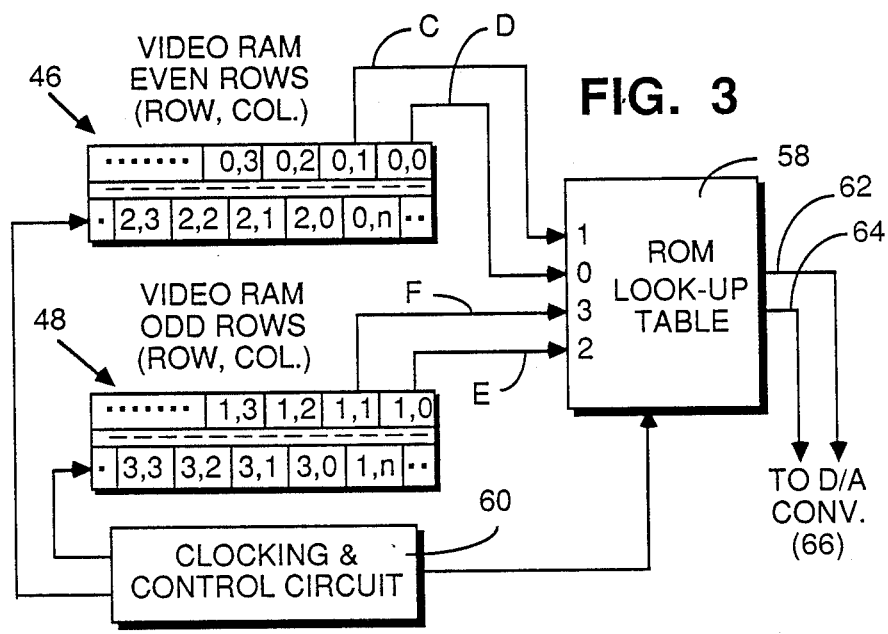
FIG. 3 is a schematic view, showing certain video RAMs which are included with the apparatus shown in FIG. 1.

The video RAMs 46 and 48 each have two tap points or two ports from which data is extracted. For example, even video RAM 46 has ports C and D, and odd video RAM 48 has ports E and F. The ports C, D, E, and F are shown simply as conductors in FIG. 3. With regard to even RAM 46, port C is used for the odd columns of data, and port D is used for the even columns of data. Correspondingly, port F is used for the odd columns of data for odd RAM 48 and port E is used for the even columns. It should be recalled that the number of pixels in the predetermined area to be examined for gray scale mapping is four (in the preferred embodiment) as derived from a 2×2 pixel area.

The method of converting a 2×2 pixel area into a single gray scale value representing that area is as follows. Assume that the examination pattern for mapping the matrix 40 of data is to start in the upper left hand corner of FIG. 2 and proceed to the right as viewed in FIG. 2. In this regard, the first 2×2 pixel area to be evaluated would include pixels 50, 52, 54, and 56; this means that the pixels in address positions (0, 0), (1, 0), (0, 1), and (1, 1), respectively, in FIG. 3 would be forwarded to the look-up table in ROM 58. The ports D, E, C, and F are coupled to the video RAMs 46 and 48 to conveniently extract the pixels 50, 52, 54, and 56, respectively, for ease of illustration. A conventional clocking and control circuit 60 is used to clock the pixels from the video RAMs 46 and 48 into the look up table 58.

Figures 5, 6:
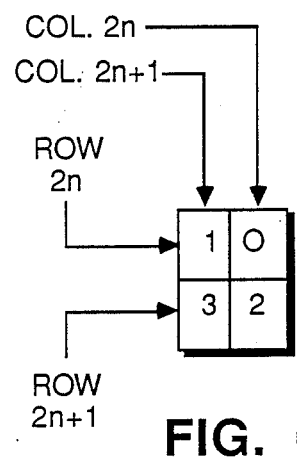
FIG. 5 is a chart showing the organization of a look-up table used in the gray scale mapping according to this invention.
FIG. 6 is a chart showing the assignment of bit positions used for an address shown in the look-up table shown in FIG. 5.

Continuing with the example being described, the particular bits (whether "1" or "0") provide an address for obtaining the gray scale value from the look-up table 58. In this regard, the assignment of bit positions is shown in FIG. 6 for a particular 2×2 area being examined. The even rows are as shown as 2n and the odd rows are shown as 2n+1. Correspondingly, the even columns are shown as 2n and the odd columns are shown as 2n+1. The assignment of bit positions namely 0, 1, 2, and 3 is shown in FIG. 6 for any predetermined area of the matrix 40 of data being mapped. The bit position assignments (0, 1, 2, and 3) are shown in look-up table 58. Notice from table 58 that an (2×2) area from the matrix 40 of data which is completely white (0000) will have a gray level of "0" as shown by the first entry in this table. Correspondingly, a 2×2 area from the matrix 40 of data which is completely black (1111) will have a gray scale level of 3 as shown by the last entry in look-up table 58. A two bit byte of data is used to express the gray levels of 0 through 3; this is represented by the two conductors 62 and 64 (FIG. 3) which provide the input to digital to analog (D/A) converter 66 shown in FIGS. 1. The gray scale value derived from look-up table 58 is then used to control the intensity of the beam in the CRT 36. Conventional circuits, including a beam position control 28 and an intensity beam control 68 in the CRT controller 70, are used to display the gray scale value at the appropriate location within the CRT 36. Notice that four bits of pixel data from matrix 40 of data have been compressed or mapped to a single dot having a gray scale value ranging from 0 to 3 in the example described. The process just described is repeated for the remaining pixels in the matrix 40 of data.

In the embodiment described, the predetermined order or pattern for examination is to examine the four pixels which lie to the right of the four pixels already described; the next pixels to be examined in this regard are those in columns 2 and 3 of rows 0 and 1. When the nth column of pixel data is examined, the next 2×2 area to be examined becomes that located in columns 0 and 1 of rows 2 and 3. Naturally, the examining order just described can be altered to suit different applications.

Another point to be made with regard to the gray scale mapping just described in relation to lookup table 58 is that the gray scale levels assigned to an area (2×2) under examination may be changed to suit particular applications. For example, when the image data associated with a document is printed data, the dark lines on the document are important. Consequently, whenever one or two black pixels exist in an examining area, the gray level assigned is "1" as shown in look-up table 58. Three black pixels, in various combinations within an examining square (2× 2), are assigned a gray scale value of 2. And finally, four black pixels are assigned a "3" as seen by the last entry in look-up table 58.

Some miscellaneous comments appear in order. As alluded to earlier herein, the source of image data 34 may be derived from an imaging means shown as part of the source 34 in FIG. 1. Documents 38 may be moved in a document track 72 by a document transport 74 past an imaging means where the data on the document is imaged to produce a matrix data as shown in FIG. 2. Some intermediate processing like compaction and expansion of data from the imaging means may take place; however, this is not important to an understanding of this invention.

While the predetermined order of examination is to move horizontally across the matrix 40 of data as described in relation to FIG. 2, other orders of examination are possible depending upon particular applications. Similarly, while a 2×2 pixel examining area is utilized in the embodiment described, other examining areas may be used. Naturally, as the examining area is increased, the memory requirements are increased; however, the principles of operation remain the same.

What is claimed is:

1. In a system in which image data for an image is provided in the form of a matrix of binary pixels of a first predetermined resolution, the method of displaying said image data onto a CRT having a resolution lower than said first predetermined resolution, comprising the steps:
    (a) selecting a block of four of said pixels which represents a predetermined area of said image data;
    (b) examining only the status of each pixel in said predetermined area to determine whether it is a binary one or a binary zero;
    (c) assigning a predetermined value ranging from zero through three for the various combinations of binary ones and binary zeros which exist in said block of four pixels in said predetermined area, with said predetermined value representing said block of four pixels;
    (d) using a said predetermined value to control a gray scale value ranging from completely white to completely black for displaying on said CRT said gray scale value as representing solely said predetermined area of said image, said displaying being effected on said CRT at a resolution which is lower than said first predetermined resolution;

(e) selecting in a predetermined order or examining pattern an adjacent and completely new block of four pixels which represents said predetermined area for said image; and (f) repeating steps b, c, and d for said adjacent predetermined area and the remaining predetermined areas for the entire said image until the entire image is completely displayed.

2. The method as derived in claim 1 in which said selecting step e is effected by moving along rows of said matrix of binary pixels until the last column of pixels in said matrix is selected.

3. A system comprising:

a source of image data of a first predetermined resolution stored in the form of a matrix of rows and columns of binary pixels;

first means for storing even rows of said binary pixels in a first memory at addresses corresponding to their locations in said matrix;

second means for storing odd rows of said binary pixels in a second memory at addresses corresponding to their locations in said matrix;

means for selecting from said first and second means a group of four of said pixels corresponding to a predetermined area of said matrix of binary pixels;

representing means for representing said group of four binary pixels as a single gray scale value which is a function of the number of binary pixels of a first type within said group of four binary pixels corresponding to a predetermined area of said matrix of binary pixels, said gray scale value ranging from zero through three; and display means for displaying said single gray scale value at a location corresponding to said predetermined area of said matrix of binary pixels;

said display means including a beam control and a CRT having a resolution which is less than said first predetermined resolution, with said gray scale value being used to control the intensity of said beam control.

4. The system as claimed in claim 3 in which said first and second means include first and second video memories, respectively.

5. The system as claimed in claim 3 in which said representing means includes a look-up table whose output is said gray scale value.

6. The system as claimed in claim 4 in which said first and second video memories include ports which are coupled to said look-up table to provide addresses thereto for determining a said gray scale value.

* * * * *

UNITED STATES PATENT AND TRADEMARK OFFICE
CERTIFICATE OF CORRECTION

PATENT NO. : 4,924,522

DATED : May 8, 1990

INVENTOR(S) : John E. Bray et al.

It is certified that error appears in the above-identified patent and that said Letters Patent is hereby corrected as shown below:

Column 6, line 53, after the word "only" insert --once--.

Column 7, line 9, delete the word "derived" and substitute --claimed--.

Signed and Sealed this

Twenty-fifth Day of June, 1991

Attest:

HARRY F. MANBECK, JR.

*Attesting Officer*  *Commissioner of Patents and Trademarks*